United States Patent [19]
Holthuis

[11] 3,877,366
[45] Apr. 15, 1975

[54] PRESS FILTER

[75] Inventor: Theodorus Henderikus Holthuis, Veendam, Netherlands

[73] Assignee: Nivoba B.V., Veendam, Netherlands

[22] Filed: Dec. 28, 1973

[21] Appl. No.: 429,652

[52] U.S. Cl. ............... 100/121; 100/153; 100/174; 100/211; 210/400; 210/405
[51] Int. Cl. ......................... B30b 9/20; B30b 9/24
[58] Field of Search .................. 100/105, 110–112, 100/116, 118, 120, 121, 90, 151–154, 174, 211; 210/396, 400, 405; 162/317, 210

[56] References Cited
UNITED STATES PATENTS

| | | | |
|---|---|---|---|
| 2,669,360 | 2/1954 | Little | 210/396 |
| 2,919,751 | 1/1960 | Engel et al. | 100/121 X |

FOREIGN PATENTS OR APPLICATIONS

| | | | |
|---|---|---|---|
| 1,400,799 | 4/1965 | France | 100/118 |
| 1,090,963 | 10/1960 | Germany | 100/121 |
| 7,003,414 | 9/1971 | Netherlands | 100/121 |

*Primary Examiner*—Peter Feldman
*Attorney, Agent, or Firm*—Stewart and Kolasch, Ltd.

[57] ABSTRACT

Press filter comprising a plurality of drums having a perforated cylindrical surface and adapted to rotate about parallel shafts, a closed, endless belt passing under pressure round a major part of each drum, feeding means for supplying pulp to be squeezed between each drum and the belt and members for discharging fluid from the drums and solids from behind each drum, provided with members for removing solids from each cylindrical drum surface upstream from the point where the belt leaves the drum surface and by throttle members for maintaining pressure on the squeezed solids until the solids have been removed brom the drum surface.

11 Claims, 9 Drawing Figures

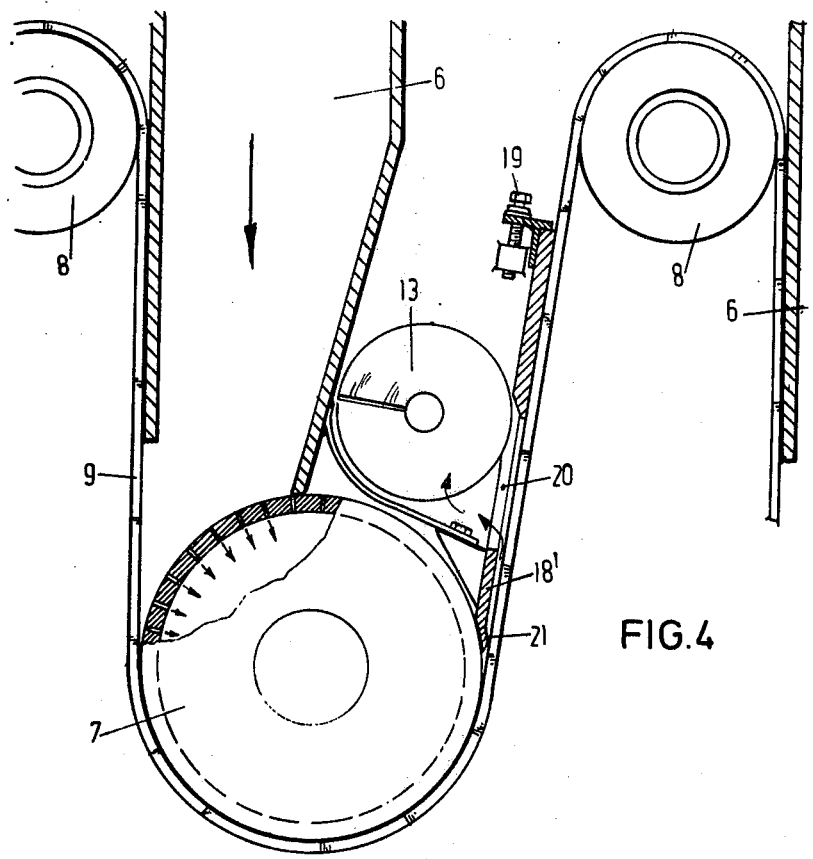
FIG. 4
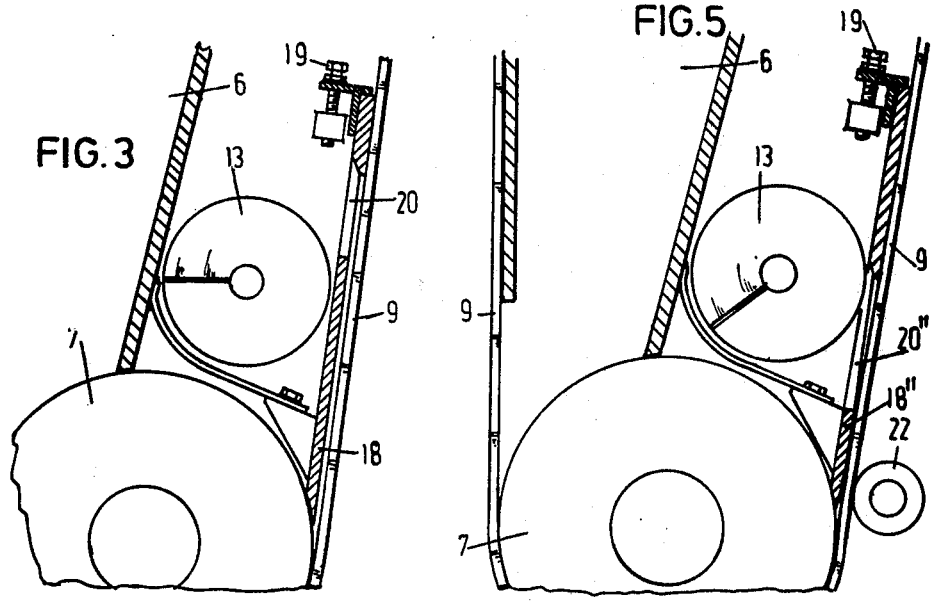
FIG. 3
FIG. 5

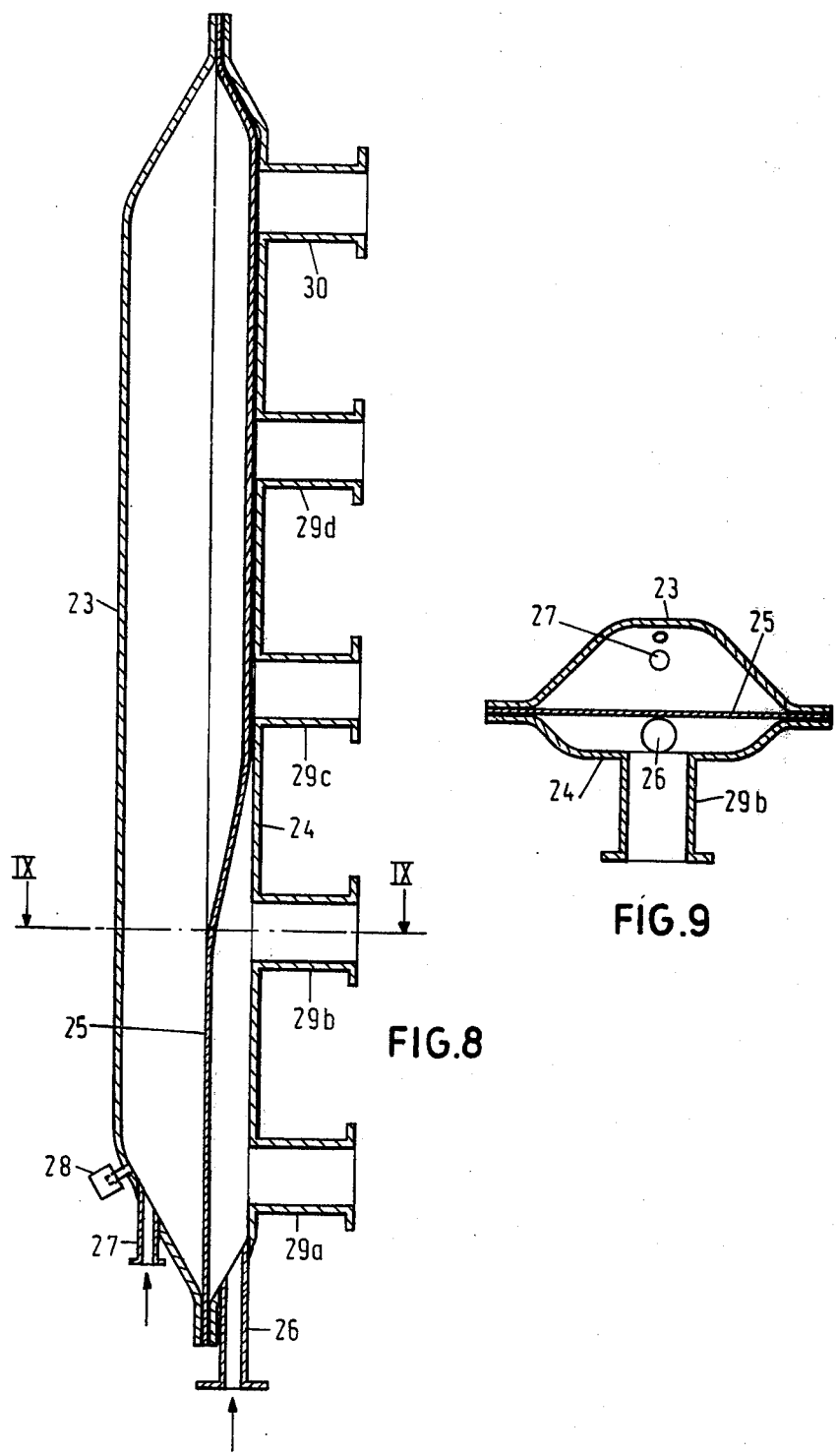

PRESS FILTER

The invention relates to a press filter, comprising a plurality of drums adapted to rotate about parallel shafts and having each a perforated cylindrical surface, a closed, endless belt passing around a major part of each drum whilst exerting pressure, feeding members for supplying pulp to be squeezed between each drum and the belt and members for discharging fluid from the drums and solids from behind each drum.

The separate effect of such a press filter can be improved by providing it with members for removing the squeezed solids from each cylindrical drum surface upstream from the point where the belt leaves the drum surface and with throttle members for maintaining at least the pressure exerted on the pulp during the squeezing operation on the squeezed solids until the latter is removed from the drum surface.

By these structural features the squeezed solids are prevented from resucking fluid squeezed from the pulp as soon as the pressure decreases, which would have an adverse effect on the separating capacity of the press filter.

The members for removing the squeezed solids preferably comprise a pick-up knife bearing on the cylindrical drum surface, whilst the throttle members for maintaining the pressure are provided with a transverse ridge on the knife extending across at least the effective width of the knife and facing the belt. In a preferred embodiment the pressure on the squeezed solids can be simply adjusted, by a transverse pressing roller adjustably loaded bearing on the side of the belt remote from the knife, which roller may be journalled in pivotable bearings so as to be adjustable towards and away from the knife.

The press filter as described above has its optimum effect when the drums are not partially loaded, that is to say either fully loaded or idling and when the pulp to be squeezed is fed to the drums under a given bias pressure depending upon the nature of the pulp.

These two conditions can be satisfied by supply means comprising a pump, a main duct communicating herewith, a plurality of branch ducts individually communicating with the main duct and each leading to a drum and a fexible loading diaphragm extending at least from the pump side of the first branch duct and beyond the last branch duct and capable of sealing the branch ducts. In order to match the bias pressure with the pulp to be squeezed it is advisable to render the load on the diaphragm adjustable.

In a practically quite satisfying embodiment the main duct is formed by a mainly cylindrical tube enclosing a flexible, pressure tight hose, forming the diaphragm the outer diameter of which approximately corresponds with the inner diameter of the tube. For adjusting the pressure and maintaining the same at an adjusted value the hose is preferably provided with a device for the supply of a compressed medium thereto and with an adjustable pressure relief valve.

These and further features of the invention will be explained more fully hereinafter with reference to the drawing which shows some practical embodiments of the press filter embodying the invention.

FIGS. 3, 4 and 5 show three embodiments of a detail of a press filter embodying the invention.

FIG. 8 is a vertical longitudinal sectional view of a variant of the supply members shown in FIG. 6.

FIG. 9 is a cross sectional view taken on the line IX—IX in FIG. 8.

Figure 1:
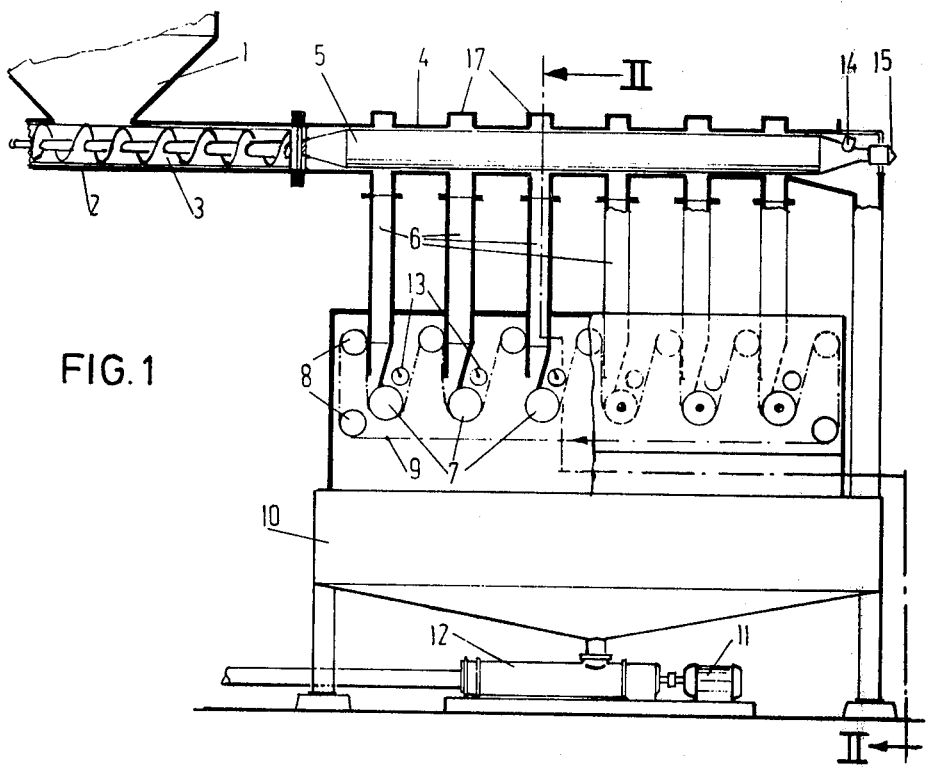
FIG. 1 is a side elevation and a partial sectional view of a press filter in accordance with the invention.
Figure 2:
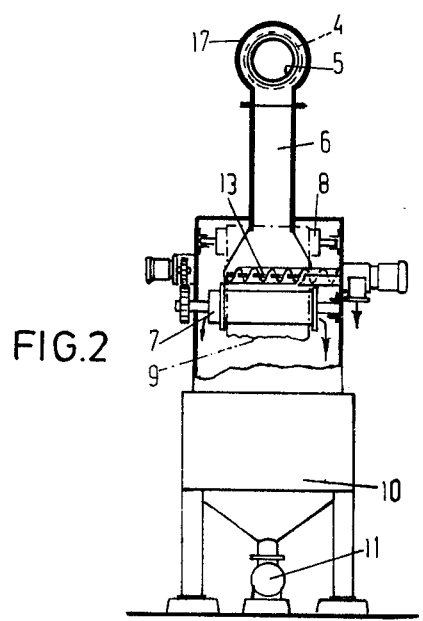
FIG. 2 is a vertical sectional view taken on the line II—II in FIG. 1.

FIG. 1 is a side elevation and partially a sectional view of a press filter comprising mainly a hopper 1 for the material to be squeezed, a displacer pump 2, 3 for conveying and pressurising the material, a cylindrical main duct 4 including an inflatable flexible hose 5 fastened with its leading end in the feeding end of the main duct 4, branch ducts 6 communicating with the main duct 4 and each leading to a separate drum 7 having a perforated cylindrical wall and adapted to rotate about a horizontal shaft, a common, endless belt 9 passing around the drums, return and tensioning rollers 8, a collecting through 10 for the fluid squeezed out of the material and a duct for conducting said fluid away provided with a pump 12 driven by a motor 11.

The press filter shown operates as follows: The pulp fed by the pump 2, 3 from the hopper 1 through the main duct 4 and the first branch duct 6 under a given pressure gets in between the belt 9 and the first drum 7. The pulp is increasingly compressed between the belt and the drum and accordingly fluid of the pump is forced through the perforated cylindrical wall into the interior of the drum, the fluid being subsequently removed to the collecting trough 10. Where the belt leaves the drum the solids emerge in the squeezed state and are removed, for example, by means of a worm conveyor 13.

In order to have the drums to always either fully loaded or idling the main duct comprises a control member by which additionally the pressure at which the pulp is to be squeezed is moved in between the drums and the belt can be adjusted and maintained at an adjusted value.

For this purpose the main duct 4 encloses a closed flexible hose 5, the narrowing leading end of which is fastened in the inlet end of the main duct. At the rear end the hose 5 is provided with a supply duct 14 for a pressurized medium, for example, compressed air and with a pressure relief valve 15, which is preferably adjustable for controlling the pressure in the hose and for adapting it to the requirements for the pulp to be squeezed.

In the idling state the outer diameter of the hose 5 is preferably equal to the inner diameter of the main duct 4, since the pressure at which the pulp is fed to the press filter equals the pressure in the hose 5 adjusted by means of the valve 15.

In order to prevent the hose from sinking unintentionally down on an opening between the main duct 4 and a branch duct 6 or from being urged thereon, so that the opening is closed, the communication between the main duct and every branch duct is preferably established by means of several communication openings 16 distributed along the circumference of the main duct and opening into a case 17 locally surrounding the main duct and each communicating with a branch duct 6.

In order to avoid an unwanted pressure increase in the case of a very large supply of pulp, the main duct 4 is provided at the end remote from the pump 2, 3 with an outlet by which the excess quantity of pulp is conducted to the collecting trough 10 or fed back to the hopper 1.

FIGS. 3, 4 and 5 show partial enlargements of three embodiments for enhancing the separating effect of the press filter.

FIG. 3 is a vertical sectional view of a drum 7 with a belt 9 running along a major part thereof and a branch duct 6 opening above the same for supplying pulp to be squeezed. The pulp is gradually subjected to an increasing pressure and squeezed between the cylindrical drum wall and the tensioned belt 9 and it gives off fluid across the perforated wall of the drum 7, said fluid being conducted away through the interior of the drum, but being partially carried upwards on the inner side of the drum wall owing to the rotation of the drum.

At the point where the belt leaves the drum surface the pressure exerted on the squeezed solid substance drops so that the substance is capable of resucking in the fluid carried along the inner side of the drum wall.

In order to avoid this unwanted phenomenon the squeezed cake is removed from the drum wall by means of a pick-up knife 18. This knife bears with an adjustable pressure on the drum wall directly beyond the point where the belt 9 leaves the drum. Said pressure is adjustable by means of the set screw 19.

The filter cake 19 is kept under pressure by means of a throttle member until it has left the drum surface. For this purpose the knife 18, arranged approximately parallel to the belt at said point, has a considerable length in the direction of movement of the belt up to the passage 20 in said knife for conducting the cake to the worm conveyor 13. Owing to the friction between the cake and the knife and the fairly long path of friction the pressure in the cake gradually decreases and remains substantially the same until the cake is removed from the drum.

FIG. 4 shows a further, very simple embodiment of the trottle member for temporary maintaining the pressure. On the side facing the belt 9 the knife 18' has a ridge 21 extending over the the effective width of the knife. The cake cannot expand until it has passed the narrow gap between the ridge and the belt.

FIG. 5 shows a further embodiment in which the throttle member formed by a pressing roller 22, bearing on the side of the belt remote from the knife 18'' and preferably provided with an elastic coating urges the belt towards the knife 18'', this forming a choke for the cake removed from the drum 7. By arranging the roller 23 so as to be adjustable towards and away from the knife, the pressure can be controlled in a simple manner.

In the embodiments shown in FIGS. 4 and 5 the distance between the knife edge bearing on the drum 7 and the passage 20' may be much smaller than in the case illustrated in FIG. 3.

Figures 6, 7:
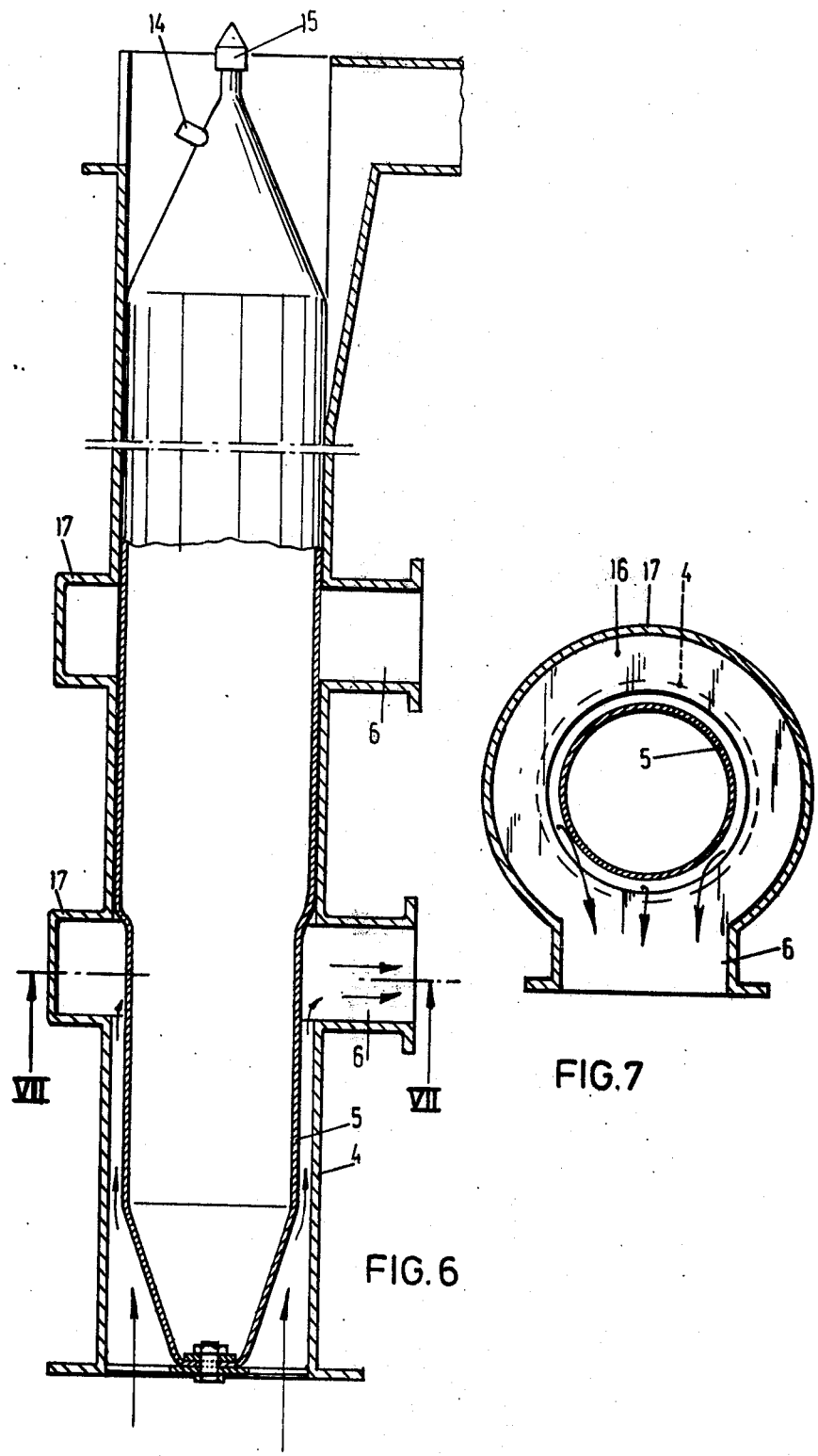
FIG. 6 is a vertical longitudinal sectional view of part of the supply members of the filter shown in FIG. 1.
FIG. 7 is a cross sectional view taken on the line VII—VII in FIG. 6.

FIGS. 6 and 7 show on an enlarged scale the supply members shown in FIG. 1 for the pressurized supply of pulp to the drums. In the interior of the cylindrical main duct 4 a cylindrical flexible hose 5 of elastic pressure tight material is secured to the inlet end, the outer diameter of said hose being equal to or some larger than the inner diameter of the main duct 4. At the rear end the hose is provided with a communication duct for supplying a pressurized medium and with an adjustable pressure-relief valve 15, by means of which the pressure of the pressurized medium in the hose can be kept an an adjustable constant value.

In the state shown in FIG. 6 the pressure in the hose 5 has a value such that owing to the pressure drop in the supplied pulp at the first branch duct 6 said pressure is approximately equal upstream of said branch duct so that the hose 5 is in an unloaded state. Beyond the first branch duct 6 the pressure overcomes the decreased pressure in the pulp so that the hose 5 locally expands radially and joins the wall of the main duct 4 as is illustrated in FIG. 6.

When the supply rate of pulp increases, the pressure drop at the first branch duct will decrease so that the pressure of the pulp beyond the first branch duct can overcome the pressure in the hose. Then the hose will be in the unloaded state up to the pressure drop then occurring on the second branch duct 6, so that the pulp can flow through the second branch duct 6. With a continuation of pulp supply this process is repeated until the pulp possibly flows away through the outlet at the rear end of the main duct so that the pressure adjusted by the pressure-relief valve 15 can nevertheless be maintained.

FIGS. 8 and 9 show corresponding sectional views of a variant of the supply members. The main duct is now comprised of elongated relatively fitting flanged portions 23 and 24, between which an elastic diaphragm 25 is clamped. The lower portion 24 is provided with a pulp supply duct 26, with branch ducts 29a-d and with an outlet 30. The upper portion 23 is provided with a supply duct 27 for pressurizing fluid and with a pressure relief valve 28. The operation is essentially the same as that of the first embodiment, the radial expansion of the hose being, however, replaced by a downward movement of the diaphragm 25.

FIG. 8 illustrates the position of the diphragm 25 when pulp is flowing through two branch ducts.

What is claimed is:

1. Press filter comprising a plurality of drums having a perforated cylindrical surface and adapted to rotate about parallel shafts, a closed, endless belt passing under pressure round a major part of each drum, feeding means for supplying pulp to be squeezed between each drum and the belt and members for discharging fluid from the drums and solids from behind each drum, characterized by members for removing solids from each cylindrical drum surface upstream from the point where the belt leaves the drum surface and by throttle members for maintaining at least the pressure on the squeezed solids which was exerted on the pulp until the solids have been removed from the drum surface.

2. A press filter as claimed in claim 1, characterized in that the members for removing the squeezed solids comprise a pick-up knife bearing on the cylindrical drum surface and in that the throttle members for maintaining the pressure are formed by a transverse ridge on the pick-up knife extending across at least the effective width of the knife and facing the belt.

3. A press filter as claimed in claim 1, characterized in that the members for removing the squeezed solids comprise a pick-up knife bearing on the cylindrical drum surface and in that the throttle members for maintaining the pressure are formed by a transverse pressing roller extending across at least the effective width of the knife and adjustably loaded bearing on the side of the belt remote from the knife.

4. A press filter as claimed in claim 3, characterized in that the pressing roller is adjustable towards and away from the knife.

5. A press filter as claimed in claim 2 characterized in that the knife is adjustable in a tangential direction with respect to the drum.

6. A press filter comprising a plurality of drums having a perforated, cylindrical surface and adapted to rotate about parallel shafts, an imperforated endless belt running, whilst exerting pressure, along a major part of each drum, feeding means for supplying pulp to be squeezed between each drum and the belt and members for discharging fluid from the drums and of solids from behind each drum, the supply means comprising a pump and a main duct communicating herewith, a plurality of branch ducts individually communicating with the main duct and each leading to a drum and a flexible loading diaphragm in the main duct, extending at least from the feeding side of the first branch duct and beyond the last branch duct and capable of sealing the branch ducts.

7. A press filter as claimed in claim 6, characterized in means for adjustably pressure loading the diaphragm.

8. A press filter as claimed in claim 6 wherein the main duct is an essentially cylindrical tube in which as a diaphragm a flexible pressure tight hose is arranged, the outer diameter of which approximately corresponds with the inner diameter of the tube.

9. A press filter as claimed in claim 8, wherein the hose is provided with a device for the supply of a pressurized medium thereto and with an adjustable pressure relief valve.

10. A press filter as claimed in claim 6, characterized in that each branch duct communicates with the main duct at several points distributed along the circumference of the main duct.

11. A press filter as claimed in claim 6 characterized in that the main duct is provided with an outlet at the end remote from the pump.

* * * * *